United States Patent
Kung et al.

(10) Patent No.: US 11,714,798 B2
(45) Date of Patent: Aug. 1, 2023

(54) DATA READINESS ANALYSIS SYSTEM AND DATA READINESS ANALYSIS METHOD

(71) Applicant: Delta Electronics, Inc., Taoyuan (TW)

(72) Inventors: Ju-Hsin Kung, Taoyuan (TW); Chin-Wei Chang, Taoyuan (TW); Sheng-Hua Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 239 days.

(21) Appl. No.: 16/942,460

(22) Filed: Jul. 29, 2020

(65) Prior Publication Data

US 2021/0349880 A1 Nov. 11, 2021

(30) Foreign Application Priority Data

May 8, 2020 (CN) .......................... 202010381733.X

(51) Int. Cl.
*G06F 16/00* (2019.01)
*G06F 16/23* (2019.01)
(Continued)

(52) U.S. Cl.
CPC ........ *G06F 16/2365* (2019.01); *G06F 16/215* (2019.01); *G06F 16/2282* (2019.01); *G06F 16/285* (2019.01)

(58) Field of Classification Search
CPC .. G06F 16/2365; G06F 16/285; G06F 16/215; G06F 16/2282
See application file for complete search history.

(56) References Cited

U.S. PATENT DOCUMENTS

| 7,027,931 B1 * | 4/2006 | Jones ..................... G16B 50/30 422/50 |
| 2007/0276631 A1 * | 11/2007 | Subramanian ........ G06F 11/008 702/182 |

(Continued)

FOREIGN PATENT DOCUMENTS

TW 201525714 A 7/2015

OTHER PUBLICATIONS

Mitra, Subhasish, and Kee Sup Kim. "X-compact: An efficient response compaction technique." IEEE Transactions on Computer-Aided Design of Integrated Circuits and Systems 23.3 (2004): 421-432.*

(Continued)

*Primary Examiner* — Nan Hutton
(74) *Attorney, Agent, or Firm* — Muncy, Geissler, Olds & Lowe, P.C.

(57) ABSTRACT

A data analysis system is provided in the invention. The data analysis system includes a storage device, a field-data-description-file generating module, and a general data readiness analysis module. The storage device stores a plurality of raw data. The field-data-description-file generating module generates the field-data-description files corresponding to the raw data. The general data readiness analysis module obtains a score of the consistency indicator of the raw data according to the field-data-description files. The general data readiness analysis module obtains the data of the category which needs to be analyzed from the raw data according to the category of each field-data-description file. The general data analysis module obtains the score of the completeness indicator, the score of the accuracy indicator, the score of the validity indicator, and the score of the compaction indicator which all correspond to the data of the category which needs to be analyzed.

20 Claims, 4 Drawing Sheets

(51) Int. Cl.
*G06F 16/28* (2019.01)
*G06F 16/22* (2019.01)
*G06F 16/215* (2019.01)

(56) References Cited

U.S. PATENT DOCUMENTS

2016/0217163 A1* 7/2016 Thakur .................. G06F 16/219
2020/0074310 A1* 3/2020 Li ........................... G06F 40/30
2021/0092160 A1* 3/2021 Crabtree ............. G06F 16/2477

OTHER PUBLICATIONS

Bassiouni, Mostafa A. "Data compression in scientific and statistical databases." IEEE Transactions on Software Engineering 10 (1985): 1047-1058.*
Office Action dated Dec. 27, 2021 in TW Application No. 109115288, 8 pages.

* cited by examiner

DATA READINESS ANALYSIS SYSTEM AND DATA READINESS ANALYSIS METHOD

CROSS REFERENCE TO RELATED APPLICATIONS

This application claims priority of CN Patent Application No. 202010381733.X filed on May 8, 2020, the entirety of which is incorporated by reference herein.

BACKGROUND OF THE INVENTION

Field of the Invention

The invention generally relates to data readiness analysis technology, and more particularly to data readiness analysis technology in which different data readiness analysis modules and indicators are used to analyze the different aspects of data.

Description of the Related Art

With the data collection has become more convenient, the usable data quantity are increased and the data analysis technologies has developed rapidly, too. The effective analysis result for the big data needs to depend on the good data quality. Therefore, the data quality is an important subject in the data analysis technologies. The current data quality evaluation methods may include analyzing by expert of the data analysis field directly or using the analysis software. However, the current methods do not have whole considerations for the different aspects of data quality (or data readiness) analysis. Furthermore, the evaluation flow has not been standardized and the data analytics in the subsequent applications does not be considered.

BRIEF SUMMARY OF THE INVENTION

A data readiness analysis system and a data readiness analysis method are provided to overcome the problems mentioned above.

An embodiment of the invention provides a data readiness analysis system. The data readiness analysis system includes a storage device, a field-data-description-file generating module and a general data readiness analysis module. The storage device is configured to store a plurality of raw data. The field-data-description-file generating module is coupled to the storage device and generates a plurality of field-data-description files corresponding to the plurality of raw data. The general data readiness analysis module is coupled to the storage device and the field-data-description-file generating module to obtain the plurality of raw data and the plurality of field-data-description files. The general data readiness analysis module obtains the score of the consistency indicator of the plurality of raw data according to the plurality of field-data-description files. The general data readiness analysis module obtains the data corresponding to a category which needs to be analyzed from the raw data according to the categories in each field-data-description file. Furthermore, the general data readiness analysis module obtains the score of the completeness indicator, the score of the accuracy indicator, the score of the validity indicator, and the score of the compaction indicator which all correspond to the data corresponding to the category which needs to be analyzed. The general data readiness analysis module determines the data readiness of the data corresponding to the category which needs to be analyzed according to the score of the consistency indicator, the score of the completeness indicator, the score of the accuracy indicator, the score of the validity indicator and the score of the compaction indicator.

In some embodiments, the data readiness analysis system includes a raw data readiness analysis module. The raw data readiness analysis module is coupled to the storage device and the field-data-description-file generating module to obtain the plurality of raw data and the plurality of field-data-description files. The raw data readiness analysis module obtains the score of the completeness indicator, the score of the accuracy indicator, the score of the validity indicator and the score of the compaction indicator which all correspond to each raw data according to the plurality of raw data and the plurality of field-data-description files. The raw data readiness analysis module determines the data readiness of each raw data according to the score of the completeness indicator, the score of the accuracy indicator, the score of the validity indicator and the score of the compaction indicator.

In some embodiments, the data readiness analysis system includes a specific data readiness analysis module. The specific data readiness analysis module is coupled to the storage device and the field-data-description-file generating module to obtain the plurality of raw data and the plurality of field-data-description files. The specific data readiness analysis module obtains specific data from the plurality of raw data according to a specific template and obtains the score of the completeness indicator, the score of the accuracy indicator, the score of the validity indicator, the score of the compaction indicator, the score of a fitness indicator, and the score of the quantity indicator which all correspond to the specific data. The specific data readiness analysis module determines the data readiness of the specific data according to the score of the completeness indicator, the score of the accuracy indicator, the score of the validity indicator, the score of the compaction indicator, the score of the fitness indicator, and the score of the quantity indicator.

In the embodiments of the invention, the fitness indicator is configured to determine whether the content of the specific data is met the content which is required by the specific template.

In the embodiments of the invention, the quantity indicator is configured to determine whether the amount of the specific data is sufficient according to the learning curve.

In the embodiments of the invention, the completeness indicator is configured to determine whether there is a missing value in the fields of data.

In the embodiments of the invention, the accuracy indicator is configured to determine whether there is a format error, a numeric error or an association error in the data.

In the embodiments of the invention, the validity indicator is configured to determine whether there is an abnormal cluster distribution in the data and whether the value of the data is an outlier determined by a threshold.

In the embodiments of the invention, the compaction indicator is configured to determine whether there is a repeat content or identical distribution in the data.

In the embodiments of the invention, the consistency indicator is configured to determine whether the fields of the plurality of raw data have an association with each other and whether the connected field names are consistent.

An embodiment of the invention provides a data readiness analysis method. The data readiness analysis method includes the steps of: generating a plurality of field-data-description files corresponding to a plurality of raw data; obtaining the plurality of raw data and the plurality of field-data-description files through a general data readiness analysis module; obtaining the score of the consistency indicator of the plurality of raw data according to the plurality of field-data-description files through the general data readiness analysis module; obtaining the data corresponding to a category which needs to be analyzed from the raw data according to the categories in each field-data-description file through a general data readiness analysis module, and obtaining the score of the completeness indicator, the score of the accuracy indicator, the score of the validity indicator, and the score of the compaction indicator which all correspond to the data corresponding to the category which needs to be analyzed through the general data readiness analysis module; and determining the data readiness of the data corresponding to the category which needs to be analyzed through a general data readiness analysis module according to the score of the consistency indicator, the score of the completeness indicator, the score of the accuracy indicator, the score of the validity indicator, and the score of the compaction indicator.

Other aspects and features of the invention will become apparent to those with ordinary skill in the art upon review of the following descriptions of specific embodiments of data readiness analysis system and method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
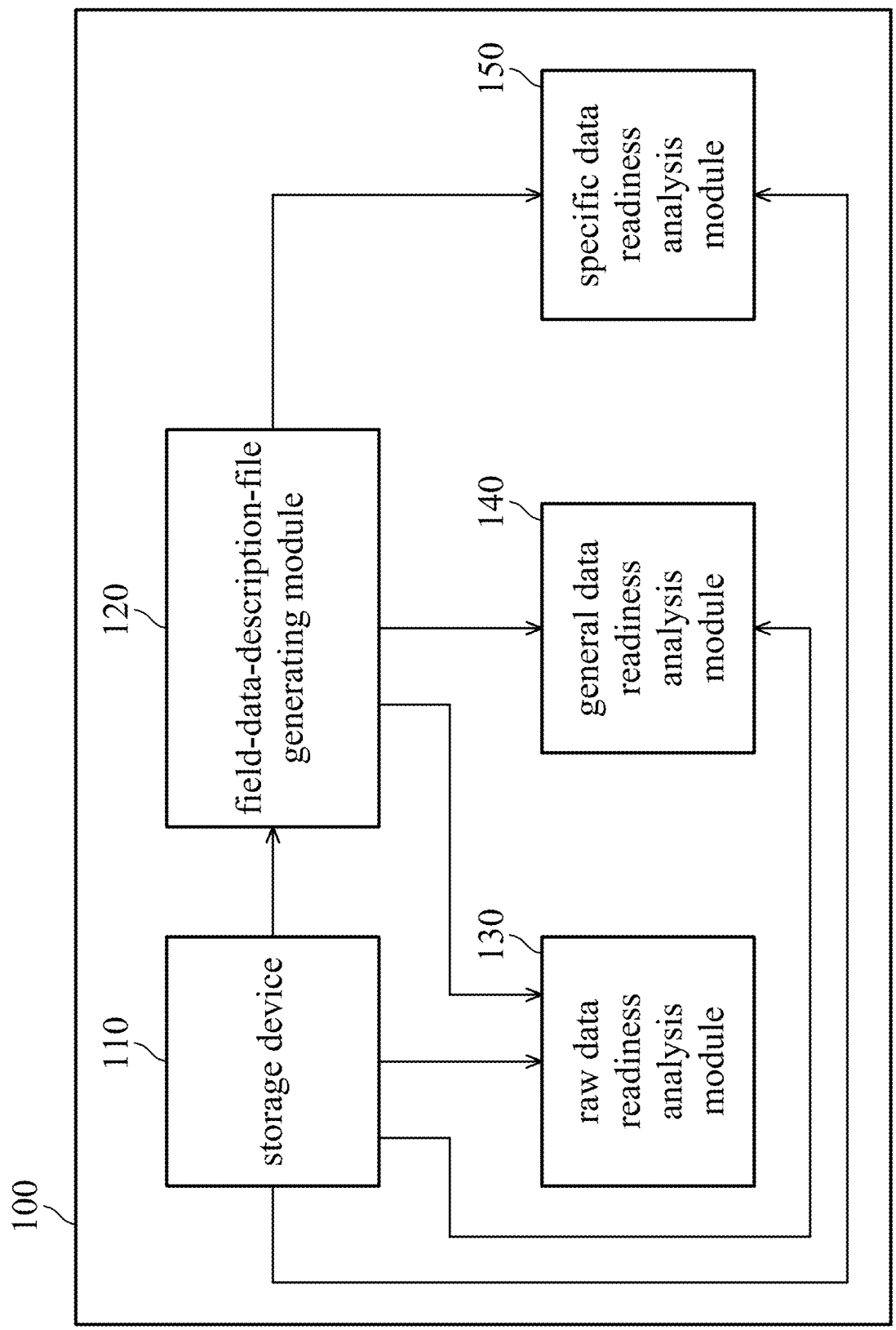
FIG. 1 is a block diagram of a data readiness analysis system 100 according to an embodiment of the invention.

FIG. 1 is a block diagram of a data readiness analysis system 100 according to an embodiment of the invention. As shown in FIG. 1, the data readiness analysis system 100 includes a storage device 110, a field-data-description-file generating module 120, a raw data readiness analysis module 130, a general data readiness analysis module 140 and a specific data readiness analysis module 150. FIG. 1 presents a simplified block diagram in which only the elements relevant to the invention are shown. However, the invention should not be limited to what is shown in FIG. 1. The data readiness analysis system 100 may also include other elements.

According to the embodiments of the invention, a plurality of collected raw data may be stored in the storage device 110. In addition, the collected raw data may be transformed into the tabular form first. It should be noted that the raw data in the invention are regarded as the raw data which have been transformed into the tabular form. That is to say, in the embodiments of the invention, the raw data stored in the storage device 110 may be a plurality of data tables. The raw data stored in the memory device 110 may be provided to the raw data readiness analysis module 130, the general data readiness analysis module 140 and the specific data readiness analysis module 150.

According to the embodiments of the invention, when the collected raw data need to be analyzed for its data readiness, the field-data-description-file generating module 120 may obtain the raw data from the storage device 110 and generate the field-data-description file of each raw data (data table) according to the obtained raw data (e.g. a plurality of data tables). Each field-data-description file may record the field name of its corresponding raw data (data table), the filed data type of each field of its corresponding raw data (data table), the category of each field of its corresponding raw data (data table), and the field relationship between the raw data (data tables), but the invention should not be limited thereto.

The field name of each raw data (data table) may be the product name, the product serial number, the material name, the personnel name or the measured value, but the invention should be limited thereto. The filed data type of each field of the raw data (data table) may include the integer (indicated as int), the word string (indicated as varchar), Boolean value (indicated as bool) or date (indicated as data), but the invention should be limited thereto. The category of each field of the raw data (data table) may include human, machine, material, method, environment, location or measurement, but the invention should be limited thereto. The content of each field of the raw data (data table) may include the corresponding description of each field name. Table 1 and Table 2 are taken as an example below.

TABLE 1

| Product | Recode Item | Serial Number | Value |
|---------|-------------|---------------|-------|
| A | Temperature | 1 | 31.5 |
| A | Velocity | 1 | 3684 |
| A | Voltage | 1 | 0.89 |
| A | Temperature | 2 | 31 |
| A | Velocity | 2 | 3680 |
| A | Voltage | 2 | 0.89 |
| ... | ... | ... | ... |

TABLE 2

| Field Name | Content of Field | Field Data Type | Category |
|------------|------------------|-----------------|----------|
| Product | name if the product | varchar | others |
| Recode Item | attribute of product | varchar | others |
| Serial Number | serial number of product | bool | others |
| Value | the value of attribute of product | Int | measurement |

Table 1 is a schematic diagram illustrating a raw data S according to an embodiment of the invention. As shown in Table 1, the raw data S of Table 1 shows the data table of the product A. It should be noted that raw data S only shows the data of product A, but the invention should not be limited thereto. Other raw data also can include the data tables of other products. In addition, the raw data S of Table 1 shows the information of the product A, but the invention should not be limited thereto. The raw data also can correspond to other data table of other analysis topics, e.g. environment measurement, human analysis, event analysis, and so on. Table 2 is a schematic diagram illustrating a field-data-description file according to an embodiment of the invention. As shown in Table 2, the field-data-description file of Table 2 shows the field name, content of field, field data type and category of each field of raw data S of Table 1. It should be noted that, Table 2 is only taken for example, but the invention should not be limited thereto. The field-data-description file also can include other information, e.g. the field relationship information between different raw data, wherein the field relationship information is established according to the data similarity of different fields.

According to the embodiments of the invention, when the raw data readiness analysis module 130 analyzes the data readiness of the raw data (e.g. a plurality of data tables), the raw data readiness analysis module 130 may obtain the raw data which are needed to be analyzed from the storage device 110 and obtain the field-data-description file corresponding to the raw data which are needed to be analyzed from the field-data-description-file generating module 120. Then, the raw data readiness analysis module 130 may calculate the score of the completeness indicator, the score of the accuracy indicator, the score of the validity indicator and the score of the compaction indicator of each raw data. The raw data readiness analysis module 130 may generate a whole sore corresponding to the data readiness of the raw data according the score of the completeness indicator, the score of the accuracy indicator, the score of the validity indicator and the score of the compaction indicator of each raw data.

According to embodiments of the invention, the completeness indicator is configured to determine whether there is a missing value or value deficiency in the fields of the data. According to an embodiment of the invention, the raw data readiness analysis module 130 may calculate the loss rate of each field of the raw data, and calculate the score of the completeness indicator corresponding to the raw data according to the loss rate of each field of the raw data. According to an embodiment of the invention, if the loss rate of one field is greater than a threshold, the raw data readiness analysis module 130 may generate a reminder message to notify the user that there is not enough data in the field.

According to embodiments of the invention, the accuracy indicator is configured to determine whether there is a format error, a numeric error, or an association error in the data. According to an embodiment of the invention. The raw data readiness analysis module 130 may calculate the score of the accuracy indicator corresponding to the raw data according to the error rate of errors (format error, numeric error and association error) in the data of the raw data.

According to an embodiment of the invention, the raw data readiness analysis module 130 may determine whether there is a format error in the data of each field of the raw data according to the field data type of each field recorded in the field-data-description file. For example, if the field data type of a field corresponds to integer (int), but the data in the field is word string (varchar), the raw data readiness analysis module 130 may determine that there is a format error in the field. It should be noted that, the example is only used to illustrate the embodiment, but the invention should not be limited thereto.

According to an embodiment of the invention, the raw data readiness analysis module 130 may determine whether the data in each field of the raw data is greater than an upper limit value or smaller than a lower limit value to determine whether there is a numeric error in the raw data. For example, if a field is used to record the body height, but a value less than 0 is in the field, the raw data readiness analysis module 130 may determine that there is a numeric error in the field. According to another embodiment of the invention, the raw data readiness analysis module 130 may determine whether there is an unreasonable value in the data in each field of the raw data to determine whether there is a numeric error in the raw data. For example, if a field is used to record the gender, but there is a value not relative to the gender in the field, the raw data readiness analysis module 130 may determine that there is a numeric error in the field. It should be noted that, the examples are only used to illustrate the embodiments, but the invention should not be limited thereto.

According to an embodiment of the invention, the raw data readiness analysis module 130 may determine whether there is an association error between the data in each field of the raw data to determine whether there is an association error in the raw data. For example, if a field is used to record Celsius temperature and another field is used to record Fahrenheit temperature, when the association between the Celsius temperature and its corresponding Fahrenheit temperature is wrong, the raw data readiness analysis module 130 may determine that there is an association error in the fields. In another example, if a field is used to record initial time and another field is used to terminal time, when an initial time is later than its corresponding terminal time, the raw data readiness analysis module 130 may determine that there is an association error in the fields. It should be noted that, the examples are only used to illustrate the embodiments, but the invention should not be limited thereto.

According to embodiments of the invention, the validity indicator is configured to determine whether there is an abnormal cluster distribution in the data and whether the value (e.g. outlier) of the data is outside the reasonable range. According to an embodiment of the invention, the raw data readiness analysis module 130 may determine whether the distribution of the data of each field in the raw data is too scattered or too concentrated to determine whether there is an abnormal cluster distribution in the raw data. When the distribution of the data of the field is too scattered or too concentrated, the samples of the raw data will be too scattered or too concentrated, as a result, the analysis value of the raw data will decrease. Therefore, when the distribution of the data of each field in the raw data is too scattered or too concentrated, the raw data readiness analysis module 130 may determines that there is an abnormal cluster distribution in the raw data. For example, if a field is used to record the apparatus number, when the apparatus numbers recorded in the field is too scattered (i.e. the collected samples are scattered to different apparatus numbers), the raw data readiness analysis module 130 may determine that there is an abnormal cluster distribution in the raw data. In another example, if a field is used to record the gender, when the data recorded in the field are too concentrated (i.e. the collected samples are too concentrated, e.g. all of the data recorded in the field are "man"), the raw data readiness analysis module 130 may determine that there is an abnormal cluster distribution in the raw data. In addition, according to another embodiment of the invention, the raw data readiness analysis module 130 may determine whether the value corresponding to each field of the raw data is higher than a threshold to determine whether the collected samples are abnormal. When the value corresponding to a field of the raw data is outside the reasonable range, the raw data readiness analysis module 130 may determine that the collected samples are abnormal. The raw data readiness analysis module 130 may calculate the score of the validity indicator corresponding to the raw data according to the result of determining whether there is an abnormal cluster distribution in the data and determining whether the value of the data is outside the reasonable range. It should be noted that, the examples are only used to illustrate the embodiments, but the invention should not be limited thereto.

According to embodiments of the invention, the compaction indicator is configured to determine whether there is a repeat content or identical distribution in the data. According to an embodiment of the invention, the raw data readiness analysis module 130 may determine whether there is a repeat field or a repeat data in the raw data to calculate the score of the compaction indicator corresponding to the raw data.

According to embodiments of the invention, when the general data readiness analysis module 140 analyzes the data readiness of the data of each category of the raw data (e.g. a plurality of data tables), the general data readiness analysis module 140 may obtain the raw data which are needed to be analyzed from the storage device 110 and obtain the field-data-description file corresponding to the raw data which are needed to be analyzed from the field-data-description-file generating module 120. Then, the general data readiness analysis module 140 may determine the correlation between each raw data to obtain the score of the consistency indicator. In addition, the general data readiness analysis module 140 may select the data of the fields corresponding to the category which is needed to be analyzed from the raw data according to the categories recorded in each field-data-description file, and calculate the score of the completeness indicator, the score of the accuracy indicator, the score of the validity indicator and the score of the compaction indicator corresponding to the data corresponding to the category which is needed to be analyzed. Finally, according the score of the consistency indicator, and the score of the completeness indicator, the score of the accuracy indicator, the score of the validity indicator and the score of the compaction indicator of the data corresponding to the category which is needed to be analyzed, the general data readiness analysis module 140 may generate a whole sore corresponding to the data readiness of the data corresponding to the category which is needed to be analyzed. Taking Table 1 and Table 2 as an example, if the category which is needed to be analyzed by the general data readiness analysis module 140 is "measurement", the general data readiness analysis module 140 may obtain the data of the field whose category is "measurement" from the raw data to perform the data readiness analysis.

According to the embodiments of the invention, the consistency indicator is configured to determine whether the fields of a plurality of raw data have an association with each other and whether the connected field names are consistent. For example, if the field B1 of raw data A1 and the field B2 of the raw data A2 correspond to the same data, but the field names of the field B1 and B2 are not consistent or the field data types of the field B1 and B2 are not consistent, the general data readiness analysis module 140 may determine the field B1 of raw data A1 and the field B2 of the raw data A2 are not consistent. When the connected field names of a plurality of raw data are not consistent, the confusion for the data readiness analysis may occur. The general data readiness analysis module 140 may calculate the score of the consistency indicator according to the coverage rate between a plurality of raw data. It should be noted that, the example is only used to illustrate the embodiments, but the invention should not be limited thereto.

According to the embodiments of the invention, the method of the general data readiness analysis module 140 calculating the score of the completeness indicator, the score of the accuracy indicator, the score of the validity indicator and the score of the compaction indicator is similar to the method by which the raw data readiness analysis module 130 calculates the score of the completeness indicator, the score of the accuracy indicator, the score of the validity indicator and the score of the compaction indicator. Therefore, details will not be repeated.

According to the embodiments of the invention, when the specific data readiness analysis module 150 may analyzes the data readiness of the specific data corresponding to a specific template in the raw data (e.g. a plurality of data tables), the specific data readiness analysis module 150 may obtain the raw data which are needed to be analyzed from the storage device 110 and obtain the field-data-description file corresponding to the raw data which are needed to be analyzed from the field-data-description-file generating module 120. In the embodiments of the invention, the specific template may be regarded as a setting of a specific data for a specific application, a specific condition or a specific requirement. Table 3 is taken as an example for illustration.

TABLE 3

| Serial Number | Temperature | Velocity | Voltage |
| --- | --- | --- | --- |
| 1 | 31.5 | 3648 | 0.89 |
| 2 | 31 | 3680 | 0.89 |
| 3 | 34 | 3568 | 0.89 |
| 4 | 32 | 3680 | 0.89 |
| 5 | 35 | 3616 | 0.89 |
| 6 | 33 | 3680 | 0.9 |
| ... | ... | ... | ... |

Table 3 is a schematic diagram illustrating a specific data according to an embodiment of the invention. Referring to Table 1, if the specific template is for the data readiness of the product A, the specific data readiness analysis module 150 may obtain the specific data of product A (as shown in Table 3) according to the information of the specific template. It should be noted that Table 3 is only used to illustrate the embodiment of the invention, but the invention should not be limited thereto. The specific template also can be for the analysis of different application.

The specific data readiness analysis module 150 may obtain the specific data from the raw data according to the specific template, and calculate the score of the completeness indicator, the score of the accuracy indicator, the score of the validity indicator, the score of the compaction indicator, the score of the fitness indicator, and the score of the quantity indicator of the specific data. Finally, the specific data readiness analysis module 150 may generate a whole sore corresponding to the data readiness of the raw data according the score of the completeness indicator, the score of the accuracy indicator, the score of the validity indicator, the score of the compaction indicator, the score of the fitness indicator, and the score of the quantity indicator of the specific data.

According to the embodiments of the invention, the fitness indicator is configured to determine whether the content of the specific data is content with the requirement of the specific template. The specific data readiness analysis module 150 may determine whether the fields in the specific data are content with the required fields in the specific template to calculate the score of the fitness indicator corresponding to the specific data. According to an embodiment of the invention, the specific data readiness analysis module 150 may determine the content of the current specific data is consistent with the content which is required by the specific template according to the history information corresponding to the specific template to calculate the score of the fitness indicator corresponding to the specific data.

According to the embodiments of the invention, the quantity indicator is configured to determine whether the data quantity of the content of the specific data is sufficient according to the learning curve. The learning curve is generated according to a data learning method. The specific data readiness analysis module 150 may generate a learning curve according to the data quantity of the content of the specific data, and generate the score of the quantity indicator according to the slope of the learning curve. When the slope of the learning curve is smaller, it means that the data quantity of the content of the specific data is enough. When the slope of the learning curve is larger, it means that there is not enough specific data content.

According to the embodiments of the invention, the method of the specific data readiness analysis module 150 calculating the score of the completeness indicator, the score of the accuracy indicator, the score of the validity indicator and the score of the compaction indicator is similar to the method by which the raw data readiness analysis module 130 calculates the score of the completeness indicator, the score of the accuracy indicator, the score of the validity indicator and the score of the compaction indicator. Therefore, details will not be repeated.

According to the raw data readiness analysis module 130, the general data readiness analysis module 140 and the specific data readiness analysis module 150 provided in the embodiments of the invention, the data readiness analysis system 100 may generate different data readiness analysis results for different aspects of data. In some embodiments of the invention, the data readiness analysis system 100 may only adopt the analysis result generated by one of the raw data readiness analysis module 130, the general data readiness analysis module 140 and the specific data readiness analysis module 150 to determine the data readiness of the data. In some embodiments of the invention, the data readiness analysis system 100 may adopt the analysis results generated by more than one of the raw data readiness analysis module 130, the general data readiness analysis module 140 and the specific data readiness analysis module 150 to perform the comprehensive assessment for the data readiness of the data.

Figure 2:
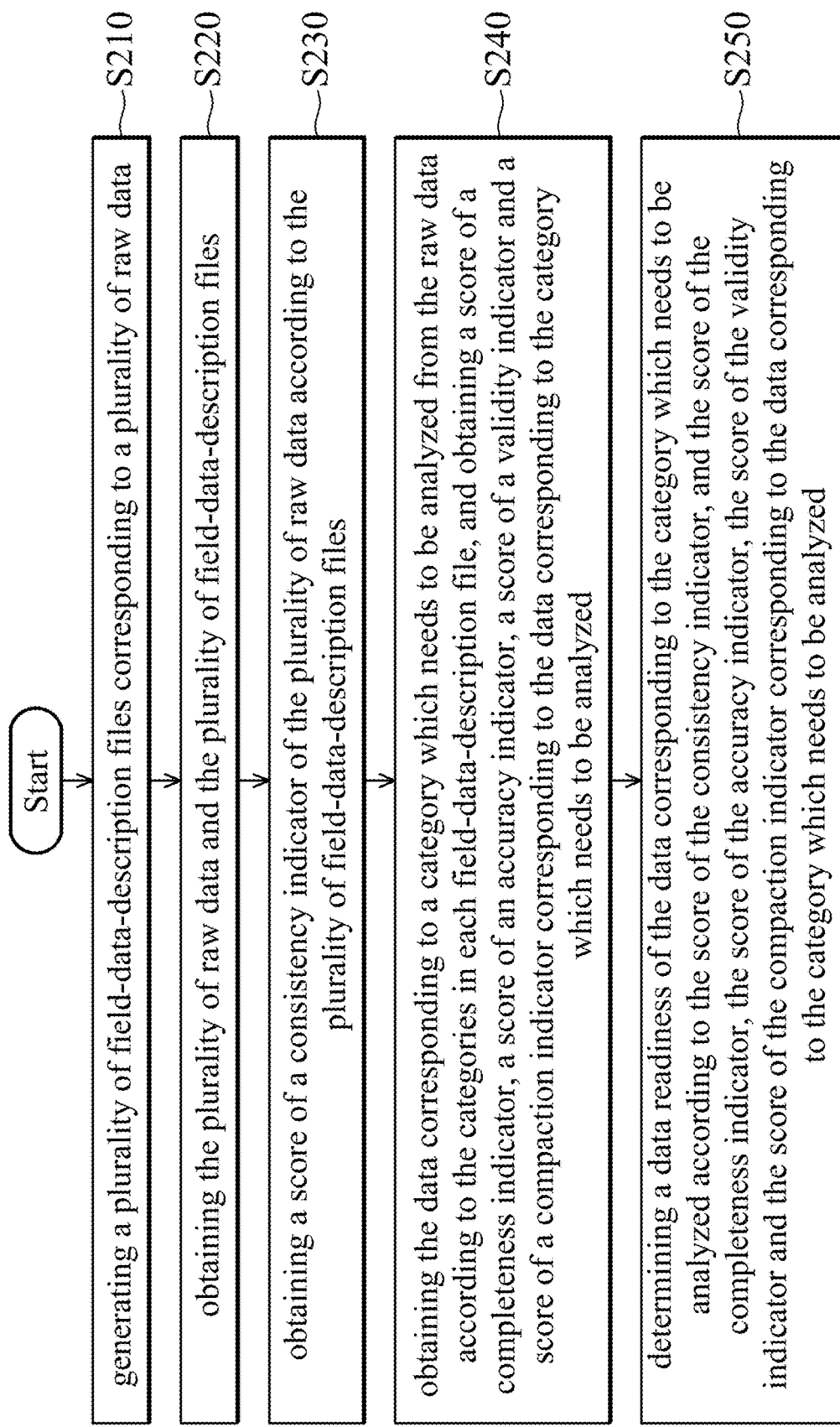
FIG. 2 is a flow chart illustrating a data readiness analysis method according to an embodiment of the invention.

FIG. 2 is a flow chart illustrating a data readiness analysis method according to an embodiment of the invention. The data readiness analysis method can be applied to the data readiness analysis system 100. As shown in FIG. 2, in step S210, a field-data-description-file generating module of the data readiness analysis system 100 generates a plurality of field-data-description files corresponding to a plurality of raw data. In step S220, a general data readiness analysis module of the data readiness analysis system 100 obtains the raw data and the field-data-description files. In step S230, the general data readiness analysis module of the data readiness analysis system 100 obtain a score of the consistency indicator of the raw data according to the field-data-description files. In step S240, the general data readiness analysis module of the data readiness analysis system 100 obtains the data corresponding to the category which needs to be analyzed from the raw data according to the categories of each field-data-description file, and obtains a score of the completeness indicator, a score of the accuracy indicator, a score of the validity indicator and a score of the compaction indicator corresponding to the data corresponding to the category which needs to be analyzed. In step S250, the general data readiness analysis module of the data readiness analysis system 100 determine the data readiness of the data corresponding to the category which needs to be analyzed according to the score of the consistency indicator, and the score of the completeness indicator, the score of the accuracy indicator, the score of the validity indicator and the score of the compaction indicator corresponding to the data corresponding to the category which needs to be analyzed.

Figure 3:
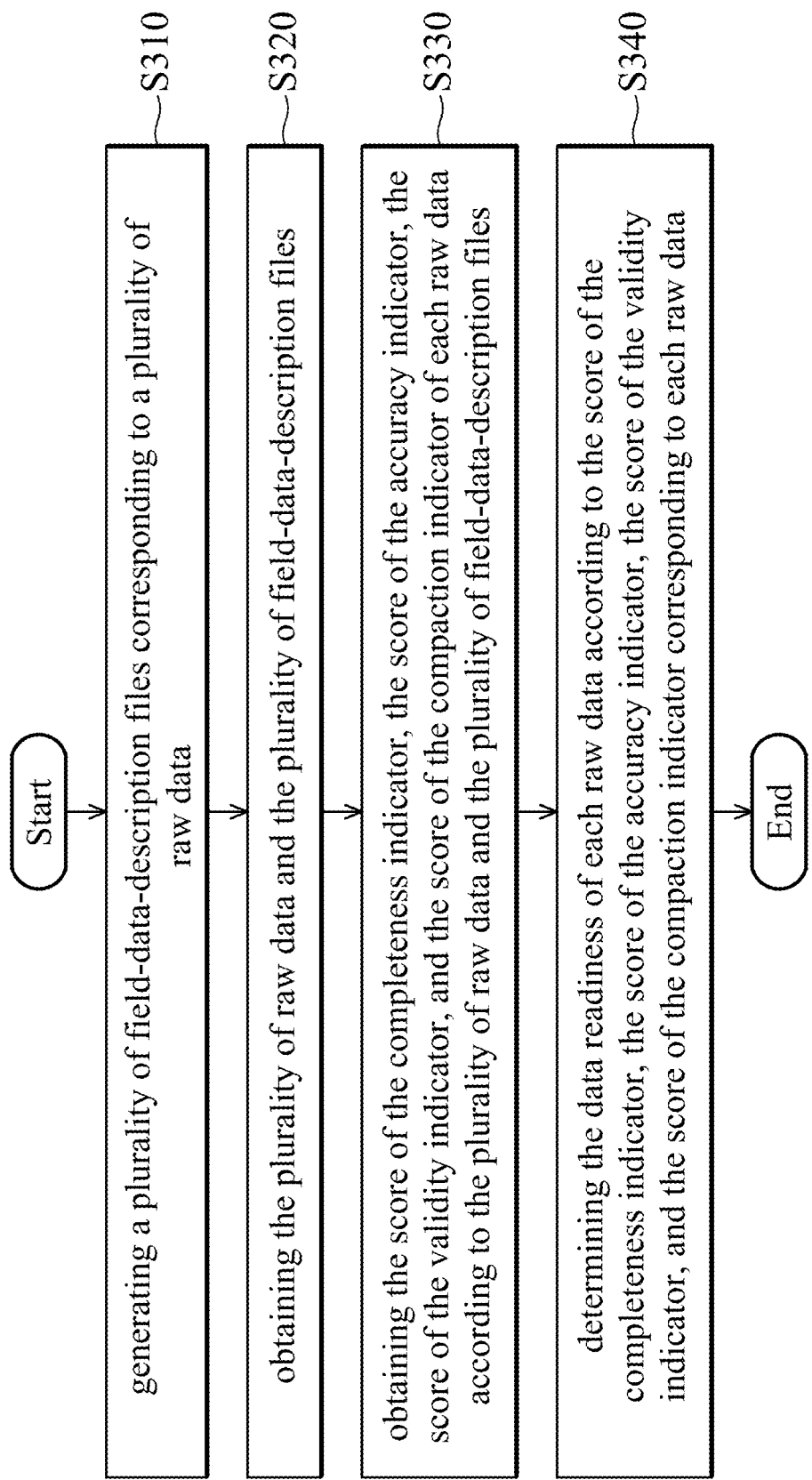
FIG. 3 is a flow chart illustrating a data readiness analysis method according to another embodiment of the invention.

FIG. 3 is a flow chart illustrating a data readiness analysis method according to another embodiment of the invention. The data readiness analysis method can be applied to the data readiness analysis system 100. As shown in FIG. 3, in step S310, a field-data-description-file generating module of the data readiness analysis system 100 generates a plurality of field-data-description files corresponding to a plurality of raw data. In step S320, a raw data readiness analysis module of the data readiness analysis system 100 obtains the raw data and the field-data-description files. In step S330, the raw data readiness analysis module of the data readiness analysis system 100 obtains a score of the completeness indicator, a score of the accuracy indicator, a score of the validity indicator and a score of the compaction indicator corresponding to each raw data according to the raw data and the field-data-description files. In step S340, the raw data readiness analysis module of the data readiness analysis system 100 determines the data readiness of each raw data according to the score of the completeness indicator, the score of the accuracy indicator, the score of the validity indicator and the score of the compaction indicator corresponding to each raw data.

Figure 4:
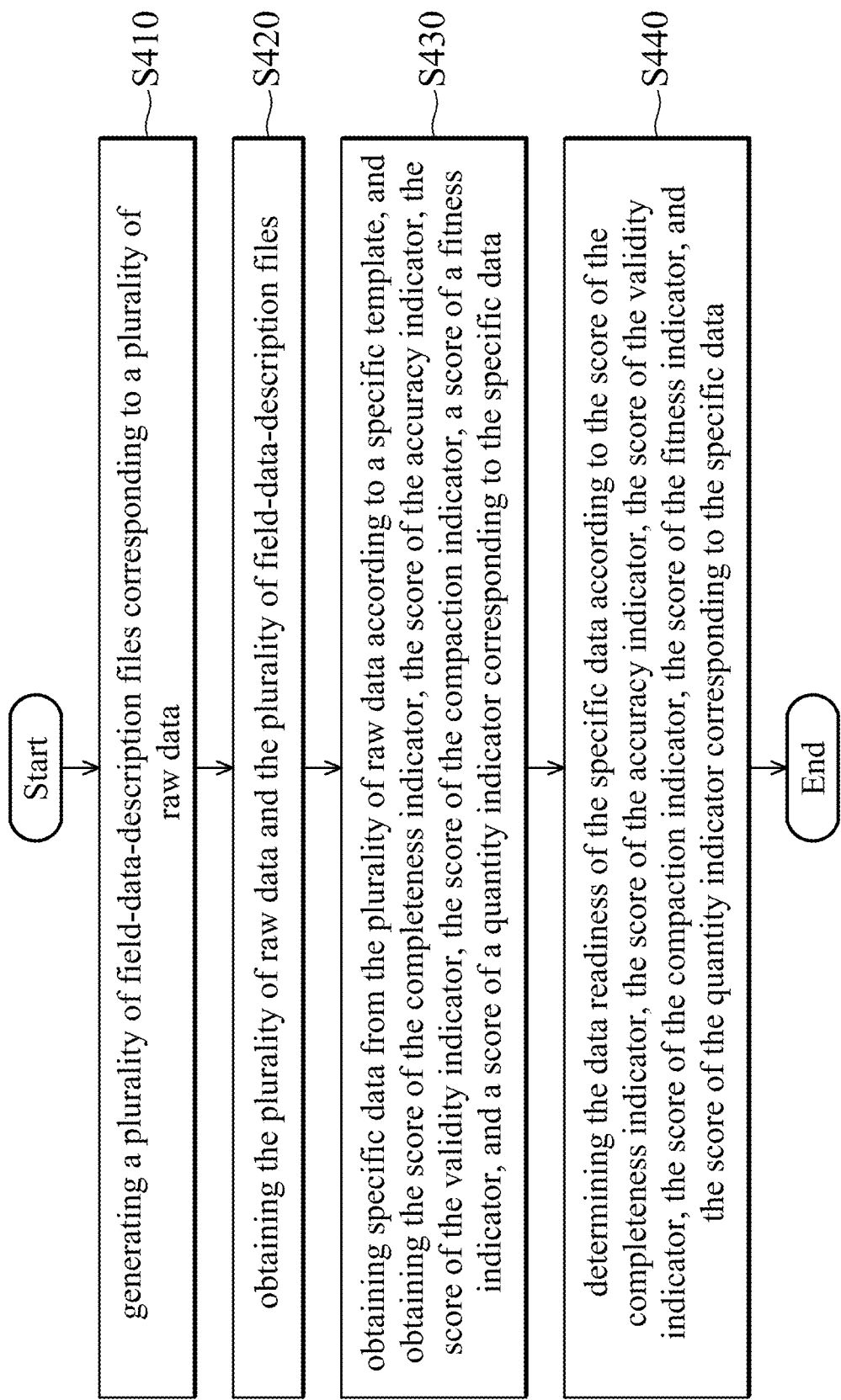
FIG. 4 is a flow chart illustrating a data readiness analysis method according to another embodiment of the invention.

FIG. 4 is a flow chart illustrating a data readiness analysis method according to another embodiment of the invention. The data readiness analysis method can be applied to the data readiness analysis system 100. As shown in FIG. 4, in step S410, a field-data-description-file generating module of the data readiness analysis system 100 generates a plurality of field-data-description files corresponding to a plurality of raw data. In step S420, a specific data readiness analysis module of the data readiness analysis system 100 obtains the raw data and the field-data-description files. In step S430, the specific data readiness analysis module of the data readiness analysis system 100 obtains specific data from the raw data according to a specific template and obtains a score of the completeness indicator, a score of the accuracy indicator, a score of the validity indicator, a score of the compaction indicator, a score of the fitness indicator, and a score of the quantity indicator corresponding to the specific data. In step S440, the specific data readiness analysis module of the data readiness analysis system 100 determines the data readiness of the specific data according to the score of the completeness indicator, the score of the accuracy indicator, the score of the validity indicator, the score of the compaction indicator, the score of the fitness indicator, and the score of the quantity indicator corresponding to the specific data.

According to the data readiness analysis method of the invention, different data readiness analysis modules and indicators can be used to analyze the different aspects of data.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may include a computer-readable medium including codes relating to one or more of the aspects of the disclosure. In some aspects a computer program product may include packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data readiness analysis system, comprising:
a storage device, storing a plurality of raw data; and
a processor, coupled to the storage device and executing operations of a field-data-description-file generating module and a general data readiness analysis module,
wherein the field-data-description-file generating module generates a plurality of field-data-description files corresponding to the plurality of raw data;
wherein the general data readiness analysis module obtains the plurality of raw data and the plurality of field-data-description files;
wherein the general data readiness analysis module obtain a score of a consistency indicator of the plurality of raw data according to the plurality of field-data-description files,
wherein the general data readiness analysis module obtains a data corresponding to a category which needs to be analyzed from the raw data according to categories in each field-data-description file, and obtains a score of a completeness indicator, a score of an accuracy indicator, a score of a validity indicator and a score of a compaction indicator which all correspond to the data corresponding to the category which needs to be analyzed, wherein the compaction indicator is configured to determine whether there is a repeat content or an identical distribution in the data corresponding to the category which needs to be analyzed;
wherein the general data readiness analysis module determines a data readiness of the data corresponding to the category which needs to be analyzed according to the score of the consistency indicator, the score of the completeness indicator, the score of the accuracy indicator, the score of the validity indicator, and the score of the compaction indicator,
wherein the processor further executes operations of a specific data readiness analysis module,
wherein the specific data readiness analysis module obtains the plurality of raw data and the plurality of field-data-description files;
wherein the specific data readiness analysis module obtains specific data from the plurality of raw data according to a specific template.

2. The data readiness analysis system of claim 1, wherein the processor further executes operations of a raw data readiness analysis module;
wherein the raw data readiness analysis module obtains the plurality of raw data and the plurality of field-data-description files;
wherein the raw data readiness analysis module obtains the score of the completeness indicator, the score of the accuracy indicator, the score of the validity indicator and the score of the compaction indicator of each raw data according to the plurality of raw data and the plurality of field-data-description files;
wherein the raw data readiness analysis module determines the data readiness of each raw data according to the score of the completeness indicator, the score of the accuracy indicator, the score of the validity indicator, and the score of the compaction indicator corresponding to each raw data.

3. The data readiness analysis system of claim 2,
wherein the specific data readiness analysis module obtains the score of the completeness indicator, the score of the accuracy indicator, the score of the validity indicator, the score of the compaction indicator, a score of a fitness indicator, and a score of a quantity indicator which all correspond to the specific data;
wherein the specific data readiness analysis module determines the data readiness of the specific data according to the score of the completeness indicator, the score of the accuracy indicator, the score of the validity indicator, the score of the compaction indicator, the score of the fitness indicator, and the score of the quantity indicator corresponding to the specific data.

4. The data readiness analysis system of claim 3, wherein the fitness indicator is configured to determine whether the content of the specific data is met the content which is required by the specific template.

5. The data readiness analysis system of claim 3, wherein the quantity indicator is configured to determine whether the amount of the specific data is sufficient according to a learning curve.

6. The data readiness analysis system of claim 3, wherein the completeness indicator is configured to determine whether there is a missing value in the fields of data.

7. The data readiness analysis system of claim 3, wherein the accuracy indicator is configured to determine whether there is a format error, a numeric error, or an association error in the data.

8. The data readiness analysis system of claim 3, wherein the validity indicator is configured to determine whether there is an abnormal cluster distribution in data and whether value of data is outside a reasonable range.

9. The data readiness analysis system of claim 3, wherein the compaction indicator is configured to determine whether there is a repeat content or identical distribution in the data.

10. The data readiness analysis system of claim 1, wherein the consistency indicator is configured to determine whether fields of the plurality of raw data have an association with each other and whether the connected field names are consistent.

11. A data readiness analysis method, comprising steps of:
generating a plurality of field-data-description files corresponding to a plurality of raw data;
obtaining the plurality of raw data and the plurality of field-data-description files by a general data readiness analysis module;
obtaining a score of a consistency indicator of the plurality of raw data according to the plurality of field-data-description files by the general data readiness analysis module;
obtaining a data corresponding to a category which needs to be analyzed from the raw data according to the categories in each field-data-description file by the general data readiness analysis module, and obtaining, by the general data readiness analysis module, a score of a completeness indicator, a score of an accuracy indicator, a score of a validity indicator and a score of a compaction indicator corresponding to the data corresponding to the category which needs to be analyzed, wherein the compaction indicator is configured to determine whether there is a repeat content or an identical distribution in the data corresponding to the category which needs to be analyzed; and
determining a data readiness of the data corresponding to the category which needs to be analyzed according to the score of the consistency indicator by the general data readiness analysis module, and the score of the completeness indicator, the score of the accuracy indicator, the score of the validity indicator and the score of the compaction indicator corresponding to the data corresponding to the category which needs to be analyzed,
wherein the method further comprising steps of
obtaining, by a specific data readiness analysis module, the plurality of raw data and the plurality of field-data-description files;
obtaining, by the specific data readiness analysis module, specific data from the plurality of raw data according to a specific template.

12. The data readiness analysis method of claim 11, further comprising steps of:
obtaining, by a raw data readiness analysis module, the plurality of raw data and the plurality of field-data-description files;
obtaining, by the raw data readiness analysis module, the score of the completeness indicator, the score of the accuracy indicator, the score of the validity indicator, and the score of the compaction indicator of each raw data according to the plurality of raw data and the plurality of field-data-description files; and
determining, by the raw data readiness analysis module, the data readiness of each raw data according to the score of the completeness indicator, the score of the accuracy indicator, the score of the validity indicator, and the score of the compaction indicator corresponding to each raw data.

13. The data readiness analysis method of claim 12, further comprising steps of:
obtaining, by the specific data readiness analysis module, the score of the completeness indicator, the score of the accuracy indicator, the score of the validity indicator, the score of the compaction indicator, a score of a fitness indicator, and a score of a quantity indicator corresponding to the specific data; and
determining, by the specific data readiness analysis module, the data readiness of the specific data according to the score of the completeness indicator, the score of the accuracy indicator, the score of the validity indicator, the score of the compaction indicator, the score of the fitness indicator, and the score of the quantity indicator corresponding to the specific data.

14. The data readiness analysis method of claim 13, wherein the fitness indicator is configured to determine whether the content of the specific data is met the content which is required by the specific template.

15. The data readiness analysis method of claim 13, wherein the quantity indicator is configured to determine whether the amount of the specific data is sufficient according to a learning curve.

16. The data readiness analysis method of claim 13, wherein the completeness indicator is configured to determine whether there is a missing value in the fields of data.

17. The data readiness analysis method of claim 13, wherein the accuracy indicator is configured to determine whether there is a format error, a numeric error or an association error in the data.

18. The data readiness analysis method of claim 13, wherein the validity indicator is configured to determine whether there is an abnormal cluster distribution in the data and whether the value of the data is outside a reasonable range.

19. The data readiness analysis method of claim 13, wherein the compaction indicator is configured to determine whether there is a repeat content or identical distribution in the data.

20. The data readiness analysis method of claim 11, wherein the consistency indicator is configured to determine whether the fields of the plurality of raw data have an association with each other and whether the connected field names are consistent.

* * * * *